Nov. 29, 1966   O. F. JENSEN   3,288,490
PASSENGER CARRYING DEVICE FOR A BICYCLE
Filed Aug. 19, 1964
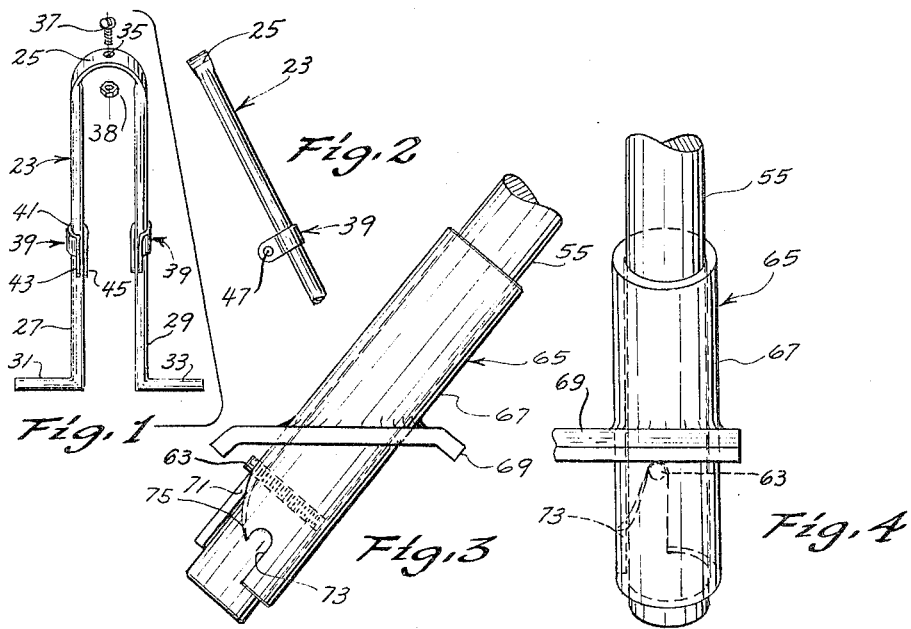
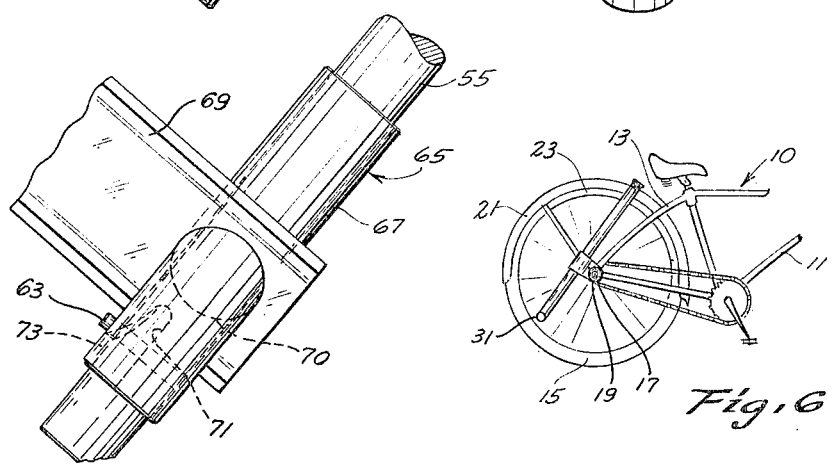
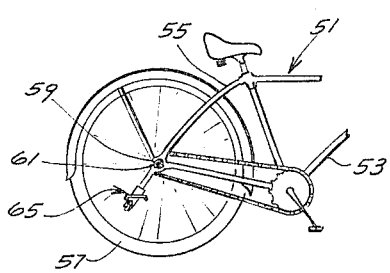
INVENTOR.
OLUF F. JENSEN
BY
*Duck & Barley*
ATTORNEYS United States Patent Office 3,288,490
Patented Nov. 29, 1966

3,288,490
PASSENGER CARRYING DEVICE FOR A BICYCLE
Oluf F. Jensen, 929 6th Ave., Council Bluffs, Iowa
Filed Aug. 19, 1964, Ser. No. 390,600
6 Claims. (Cl. 280—202)

This invention relates to a passenger carrying device and more particularly to a passenger carrying device for a bicycle which provides a support means for carrying a passenger on a bicycle.

Bicycles have very little space to facilitate the carrying of a passenger thereon. A passenger may ride on the handle bars, frame or rear fender. The most convenient place to carry a passenger is on the rear fender but the fender is usually not strong enough to support the passenger. Additionally, the passenger must suspend his feet above the ground which becomes very tedious.

Therefore, it is a principal object of this invention to provide a passenger carrying device for a bicycle.

A further object of this invention is to provide a passenger carrying device for a bicycle which is strong but yet lightweight.

A further object of this invention is to provide a passenger carrying device for a bicycle which is conveniently attached thereto.

A further object of this invention is to provide a passenger carrying device for a bicycle which is adjustable to fit a variety of bicycles.

A further object of this invention is to provide a passenger carrying device for a bicycle which may be incorporated into a bicycle frame.

A further object of this invention is to provide a passenger carrying device for a bicycle which has a foot support means which may be pivoted to an inoperative position when not in use.

A further object of this invention is to provide a passenger carrying device which provides a means for a passenger to stand behind the operator of a bicycle and to ride thereon by grasping the operator.

A further object of this invention is to provide a passenger carrying device for a bicycle which does not adversely effect the stability and balance of the bicycle.

A still further object of this invention is to provide a passenger carrying device for a bicycle which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a front elevational view of the passenger supporting means detached from the bicycle;

FIG. 2 is a fragmentary side elevational view of the device seen in FIG. 1;

FIG. 3 is a fragmentary side elevational view of an embodiment of the foot support means in an operative position;

FIG. 4 is a fragmentary front elevational view of the device seen in FIG. 3 in an operative position;

FIG. 5 is a fragmentary side elevational view of the device seen in FIG. 3 in an inoperative position;

FIG. 6 is a fragmentary side elevational view of a bicycle having the attachment seen in FIG. 1 detachably mounted thereon; and FIG. 7 is a fragmentary side elevational view of a bicycle illustrating an embodiment of the passenger carrying means wherein the rear fork member is extended below the axis of the bicycle wheel and has rotatably secured thereto the device seen in FIG. 3.

The numeral 10 generally designates a bicycle having a frame 11 including an inverted U-shaped fork 13 extending downwardly from the rearward end of bicycle 10. Rotatably mounted in fork 13 is a conventional bicycle wheel 15 having an axle 17 extending therethrough and outwardly through the opposite leg members of fork 13 in conventional manner and maintained thereon by means of nuts 19. A conventional fender 21 extends over the upper portion of wheel 15 and is secured to fork 13 and axle 17 in conventional fashion.

The numeral 23 designates a passenger support means comprised of an inverted U-shaped member having a flattened top 25 and tubular leg members 27 and 29 extending downwardly therefrom in spaced relationship. The lower ends of legs 27 and 29 terminate in a horizontal portion 31 and 33 respectively extending laterally therefrom at a right angle. Top 25 is provided with a hole 35 adapted to receive a bolt 37 which threadedly receives a nut 38.

Slidably embracing each of legs 27 and 29 is a clamp 39 comprised of an arcuate portion 41 and tab portions 43 and 45 extending therefrom having holes 47 and 49 (not shown) extending therethrough which are adapted to receive axle 17.

With respect to the embodiment seen in FIGS. 3, 4, 5 and 7, the numeral 51 generally designates a bicycle having a frame 53 including an inverted U-shaped fork 55 extending downwardly from the rearward end of bicycle 51. Rotatably mounted in fork 55 is a conventional bicycle wheel 57 having an axle 59 extending therethrough outwardly through the leg members of fork 55 and maintained thereon by means of nuts 61. It should be noted that fork 55 has its opposite leg members extending downwardly and rearwardly of axle 59 as seen in FIG. 7. Threadably inserted into the opposite leg members of fork 55 is a pin 63. Selectively rotatably mounted on each of the leg members of fork 55 is a foot support means 65 comprised of a sleeve 67 and a plate 69 having a hole 70 formed therein as seen in FIG. 5. Sleeve 67 extends through hole 70 of plate 69 and is secured thereto by welding or the like. The lower end of sleeve 69 is provided with spaced apart notches 71 and 73. It should be noted that notch 71 extends farther upwardly into sleeve 69 than does notch 73 as best seen in FIG. 3. The numeral 75 represents a protrusion in sleeve 69 between notches 71 and 73 to prevent accidental rotation of the device with respect to fork 55.

With respect to FIGS. 1 and 6 the normal method of operation is as follows. Passenger support means 23 is mounted on bicycle 10 by placing leg members 27 and 29 on opposite sides of wheel 15 and securing top portion 25 to fender 21 by means of bolt 37 and nut 38. Clamps 39 are adjusted on legs 27 and 29 so that axle 17 will extend outwardly through holes 45 in each of clamps 39 and nuts 19 secured thereto. The tightening of nuts 19 will draw tabs 43 and 45 together thereby causing arcuate portion 41 to clamp tightly around legs 27 and 29 to prevent slidable movement therebetween. It can be appreciated that clamp 39 can be adjusted for a variety of bicycles by simply slidably moving clamp 39 on the respective leg members.

The passenger simply places one foot on horizontal portion 31 and his other foot on horizontal portion 33 and grasps the operator of the bicycle. Because horizontal portions 31 and 33 are located below the axis of wheel 15, no adverse effect on the balance or stability of the bicycle is realized.

With respect to the device seen in FIG. 7, it is apparent that the leg members of fork 55 have been simply extended below their ordinary terminus. FIG. 7 illustrates a foot support means 65 on the lower end of fork 55 and is perhaps the most convenient foot support means to be secured thereto. It is obvious that rigid non-rotatable foot support members could extend laterally from the lower end of the leg members of fork 55 such as horizontal portions 31 and 33 of FIG. 1. When foot support means 65 is utilized, the passenger simply places one foot on plate 69 on one side of the bicycle wheel and his other foot on the plate 69 which is located on the opposite side of the bicycle wheel. Foot support means 65 is extremely convenient in that plate 69 may be rotated to inoperative and operative positions for greater convenience. When foot support 65 is not in use, it is simply necessary to rotate sleeve 67 and plate 69 to the left as viewed in FIG. 5 so that notch 73 receives pin 63. When it is desired to carry a passenger, foot support means 65 is rotated to the right as viewed in FIGS. 3 and 5 so that notch 71 receives pin 63. Protrusion 75 obviously prevents accidental movement of the device with respect to fork 55. Foot support means 65 could also be incorporated into the device seen in FIG. 1 rather than providing horizontal portions 31 and 33. While the utilization of notches 71 and 73 together with pin 63 is perhaps the most convenient and safest way to design the device, it is obvious that a detent means could also be utilized which would also permit sleeve 67 to slide upwardly or downwardly on fork 55 to permit vertical adjustment to compensate for the various sizes of different riders. While the device has been described as being in combination with a rear fork, it is apparent that the device could also be used on bicycles which do not have a rear fork per se.

The device could be constructed of any suitable material such as aluminum, copper or steel. Thus from the foregoing it can be seen that the device accomplishes at least all of its stated objectives.

Some changes may be made in the construction and arrangement of my passenger carrying device for a bicycle without departing from the real spirit and purpose of my invention, and it is my intention to cover by my claims, any modified forms of structure or use of mechanical equivalents which may be reasonably included within their scope.

I claim:

1. A device for carrying a passenger on a bicycle, the bicycle including a frame having an inverted U-shaped fork extending downwardly and rearwardly forward of the rearward end of the bicycle,
   a pin member secured to said fork adjacent each of its lower ends,
   a sleeve means rotatably mounted on each of lower ends of said fork,
   a plate member secured to each of said sleeve means and extending substantially at a right angle therefrom,
   each of said sleeve means having at least two spaced apart slots formed therein adapted to selectively receive said pin member therein at times,
   said two slots being in an approximate 90 degree relationship with respect to each other and said sleeve means.

2. A device for carrying a passenger on a bicycle, the bicycle including a frame having an inverted U-shaped fork extending downwardly and rearwardly forward of the rearward end of the bicycle,
   said U-shaped fork having a wheel rotatably mounted therein,
   and a foot support means on the bicycle operatively connected to said fork,
   said foot support means includes an inverted U-shaped member having a top portion and spaced apart leg members,
   a pin means secured to each of said leg members,
   a sleeve means rotatably embracing each of said leg members and having two slots formed therein adapted to selectively receive said pin means therein at times,
   said slots being in an approximately 90 degree relationship with respect to each other and said sleeve means.

3. A device for carrying a passenger on a bicycle, the bicycle including a frame having an inverted U-shaped fork extending downwardly and rearwardly forward of the rearward end of the bicycle,
   said U-shaped fork having a wheel rotatably mounted therein,
   and a foot support means on the bicycle operatively connected to said fork,
   said foot support means including foot support members positioned downwardly with respect to the axis of said wheel,
   the lower ends of said fork being tubular and each being adapted to rotatably receive a sleeve means,
   said sleeve means having a plate member secured thereto extending at a right angle therefrom.

4. A device for carrying a passenger on a bicycle, the bicycle including a frame having an inverted U-shaped fork extending downwardly and rearwardly forward of the rearward end of the bicycle,
   said U-shaped fork having a wheel rotatably mounted therein,
   a foot support means on the bicycle operatively connected to said work,
   said foot support means including foot support members positioned downwardly with respect to the axis of said wheel,
   the lower ends of said fork being tubular and each being adapted to rotatably receive a sleeve means,
   said sleeve means having a plate member secured thereto extending at a right angle therefrom,
   and a pin member secured to said fork adjacent each of its lower ends,
   said sleeve means being adapted to engage said pin member to selectively limit the rotational movement of said sleeve means with respect to said fork.

5. A device for carrying a passenger on a bicycle, the bicycle including a frame having an inverted U-shaped fork extending downwardly and rearwardly forward of the rearward end of the bicycle,
   said U-shaped fork having a wheel rotatably mounted therein,
   and a foot support means on the bicycle operatively connected to said fork,
   said foot support means including foot support members positioned downwardly with respect to the axis of said wheel,
   said foot support means being comprised of an inverted U-shaped member having a top portion and spaced apart tubular leg members adapted to rotatably receive a sleeve means,
   said sleeve means having a plate member secured thereto extending at a right angle therefrom.

6. A device for carrying a passenger on a bicycle, the bicycle including a frame having an inverted U-shaped fork extending downwardly and rearwardly forward of the rearward end of the bicycle,
   said U-shaped fork having a wheel rotatably mounted therein,
   a foot support means on the bicycle operatively connected to said fork,
   said foot support means including foot support members positioned downwardly with respect to the axis of said wheel,
   said foot support means being compised of an inverted U-shaped member having a top portion and spaced apart tubular leg members adapted to rotatably receive a sleeve means,
   said sleeve means having a plate member secured thereto extending at a right angle therefrom,
   and a pin member secured to each of said leg members adjacent their lower ends,
   said sleeve means adapted to engage said pin member to selectively limit the rotational movement of said sleeve means with respect to said fork.

References Cited by the Examiner

UNITED STATES PATENTS

| | | | |
|---|---|---|---|
| 682,325 | 9/1901 | Garrett | 297—429 |
| 924,541 | 6/1909 | Duck | 280—202 |
| 965,093 | 7/1910 | Fentress | 280—202 |
| 993,567 | 5/1911 | Stickelbaut | 280—291 |
| 1,317,378 | 9/1919 | McEnroe | 280—202 |
| 2,234,299 | 3/1941 | Christy | 280—202 |
| 2,320,344 | 6/1943 | Belanger | 280—202 |
| 2,517,957 | 8/1950 | Anderson | 280—202 |
| 2,530,498 | 11/1950 | Atwood et al. | 280—304 |
| 2,710,650 | 6/1955 | Sowder | 297—417 X |
| 3,026,962 | 3/1962 | Kramer | 182—189 X |

FOREIGN PATENTS

| | | |
|---|---|---|
| 112,684 | 11/1927 | Austria. |
| 407,496 | 10/1944 | Italy. |

KENNETH H. BETTS, *Primary Examiner.*